(12) United States Patent
Molus et al.

(10) Patent No.: US 6,511,328 B2
(45) Date of Patent: Jan. 28, 2003

(54) THROUGH PANEL WIRING SYSTEM

(75) Inventors: Richard J. Molus, Greenfield, WI (US); David E. Koopmeiners, Franksville, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/820,142

(22) Filed: Mar. 28, 2001

(65) Prior Publication Data

US 2002/0142630 A1 Oct. 3, 2002

(51) Int. Cl.⁷ ............................................... H01R 12/01
(52) U.S. Cl. ........................ 439/76.1; 439/502; 439/926
(58) Field of Search ................................ 431/76.1, 544, 431/549, 552, 553, 559, 569, 628, 638, 639

(56) References Cited

U.S. PATENT DOCUMENTS

| | | | | |
|---|---|---|---|---|
| 3,676,746 A | * | 7/1972 | Kassabgi et al. | 361/796 |
| 5,161,998 A | * | 11/1992 | Defibaugh et al. | 439/544 |
| 5,321,601 A | * | 6/1994 | Riedel et al. | 137/395 |
| 5,362,243 A | * | 11/1994 | Huss et al. | 439/76 |
| 5,855,064 A | * | 1/1999 | Chang | 29/861 |
| 5,984,716 A | * | 11/1999 | Starkey | 425/144 |
| 6,146,153 A | * | 11/2000 | Koradia et al. | 439/76.1 |

* cited by examiner

*Primary Examiner*—Tulsidas Patel
(74) *Attorney, Agent, or Firm*—Patrick S. Yoder; Alexander M. Gerasimow; William R. Walburn

(57) ABSTRACT

A programmable logic controller (PLC) assembly. The PLC assembly has a PLC and a protective enclosure having a through-panel connector. The PLC is housed within the protective enclosure and electrically coupleable to the through-panel connector. The through-panel connector has a connector portion. The connector portion is configured for mating engagement with an electrical cable. The electrical cable is electrically coupleable to a PLC input device or a PLC output device.

31 Claims, 6 Drawing Sheets

THROUGH PANEL WIRING SYSTEM

BACKGROUND OF THE INVENTION

1. Field of the Invention

The present invention relates generally to the field of wiring systems, such as for programmable logic controllers used in industrial automation applications. More particularly, the invention relates to a technique for electrically coupling electrical devices within a panel or enclosure, such as programmable controller input/output modules, to external circuitry, such as input and/or output devices.

2. Description of the Related Art

A programmable logic controller (PLC) typically includes a processor module and several input/output (I/O) modules. The I/O modules are used to couple the processor module to input and/or output (I/O) devices. Input devices provide electrical signals to the PLC. The electrical input may be used to provide the processor module with a variety of information. Output devices receive electrical output from the PLC. The PLC uses the electrical output to control the operation of the output device, such as for regulating various industrial, material handling, process, or other operations.

Typically, a processor module and several I/O modules are housed in a sealed enclosure. Additionally, in a typical application, the I/O modules are coupled to a distribution block for routing to a plurality of I/O devices. An electrical cable is routed between the I/O modules and a distribution block through an opening in the enclosure. A seal may be formed around the electrical cable to prevent water or other contaminants from entering the enclosure. However, hard wiring the electrical cable to the I/O modules and passing the electrical cable through the enclosure may require an electrician or otherwise trained technician. This may increase the time and expense of installing a system utilizing a PLC.

Moreover, where wiring is installed with and extends from this enclosure, re-wiring may sometimes be needed. For example, if the power and data conductors of a wiring bundle become damaged or severed, the entire cable may require replacement. This operation, again, can be time consuming, resulting in additional expenses for service personnel and downtime for the PLC and any controlled equipment.

There is a need, therefore, for an improved technique for electrically coupling electrical, panel-mounted devices, such as PLC's to external devices. There is, in particular, a present need for a technique to enable a customer to electrically connect a PLC to a distribution box or an I/O device without permanent hard wiring.

SUMMARY OF THE INVENTION

The present invention provides an electrical coupling technique designed to respond to these needs. According to one aspect of the technique, a protective enclosure to house a PLC is featured. The protective enclosure has a through-panel connector. The through-panel connector has a connector portion that is configured for mating engagement with an electrical cable that is electrically coupleable to a PLC input device or a PLC output device. The PLC is electrically coupleable to the through-panel connector. The through-panel connector enables the electrical cable to be electrically coupled to the PLC without permanently hard wiring the electrical cable to the PLC or having the electrical cable penetrate the enclosure.

According to another aspect of the present technique, a through-panel connector for a PLC is featured. The through-panel connector comprises a first electrical connector and a second electrical connector. The first electrical connector and the second electrical connector are electrically coupled to one another. The first electrical connector is used to couple an internal cable from an I/O module to the through-panel connector. The second electrical connector is used to couple an external cable to the through-panel connector.

According to another aspect of the present technique, a method of electrically coupling a PLC housed within an enclosure to an electrical apparatus is featured. Additionally, a method of assembling a PLC within a protective enclosure also is featured.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
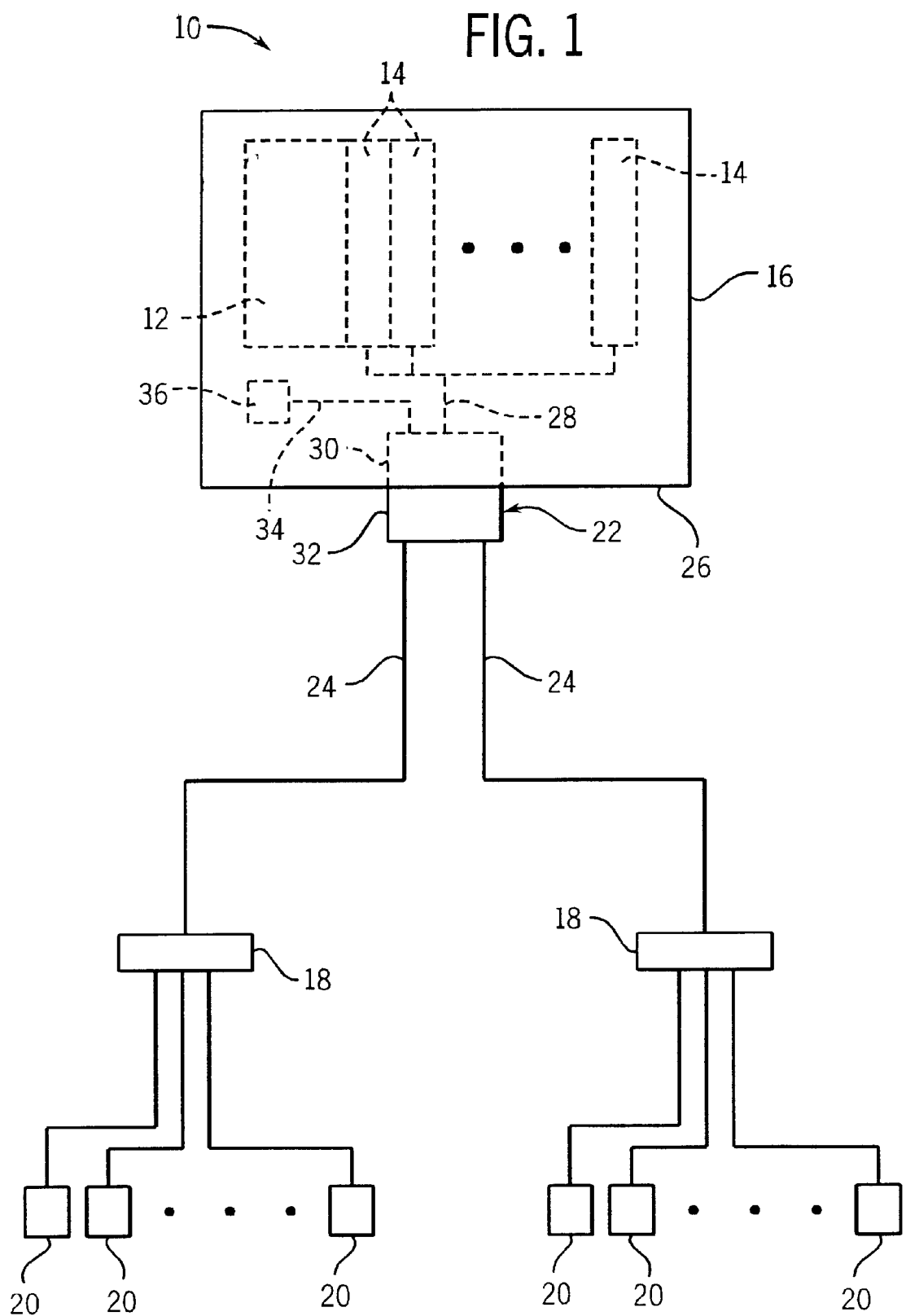
FIG. 1 is a schematic drawing of a PLC system, according to an exemplary embodiment of the present invention.

Turning now to the drawings, and referring first to FIG. 1, an industrial control system 10, typically including a PLC, is illustrated. System 10 includes a processor module 12 and several I/O modules 14 housed within an enclosure 16. In the illustrated embodiment, the I/O modules 14 are electrically coupled to two distribution blocks 18. However, a greater or lesser number of distribution blocks 18 may be used. The distribution blocks 18 couple the I/O modules 14 to a plurality of input and/or output devices 20. An input device may be any of a variety of devices, such as a temperature sensor, a pressure sensor, a proximity sensor, a capacitive sensor, a photoelectric sensor, etc. An output device also may be any of a variety of devices, such as a solenoid, a relay, a starter, etc. The processor module 12 and I/O modules 14 provide electrical signals to the output devices and receive electrical signals from the input devices.

In the illustrated embodiment, a through-panel connector 22 is used to electrically couple two external cables 24 from the two distribution blocks 18 to an internal cable 28 from the I/O modules 14. The through-panel connector 22 enables the external cables 24 to be connected to a coupling device on the exterior of the enclosure 16, rather than requiring external cables 24 to penetrate enclosure 16 to be hardwired directly to the I/O modules 14. The through-panel connector 22 is secured to a panel 26 of enclosure 16. The panel 26 can be on any side of the enclosure: front, side, top, bottom, or back. Internal cable 28 is used to couple the I/O modules 14 to an interior connector portion 30 of the through-panel connector 22. The two external cables 24 are coupled to an exterior connector portion 32 of the through-panel connector 22.

Additionally, the illustrated embodiment enables the through-panel connector 22 to couple a source of power to the I/O devices 20 and/or the I/O modules 14. In the illustrated embodiment, conductors 34 from a source of electrical power and/or data signals can be coupled to the interior portion 30 of the through-panel connector 22. The through-panel connector 22 may be configured to direct electric power and/or data signals to the I/O modules 14 and/or the I/O devices 20. Power can be supplied to the PLC via the internal cable 28 and power and/or data signals can be supplied to the I/O devices via the external cables 24.

Figure 2:
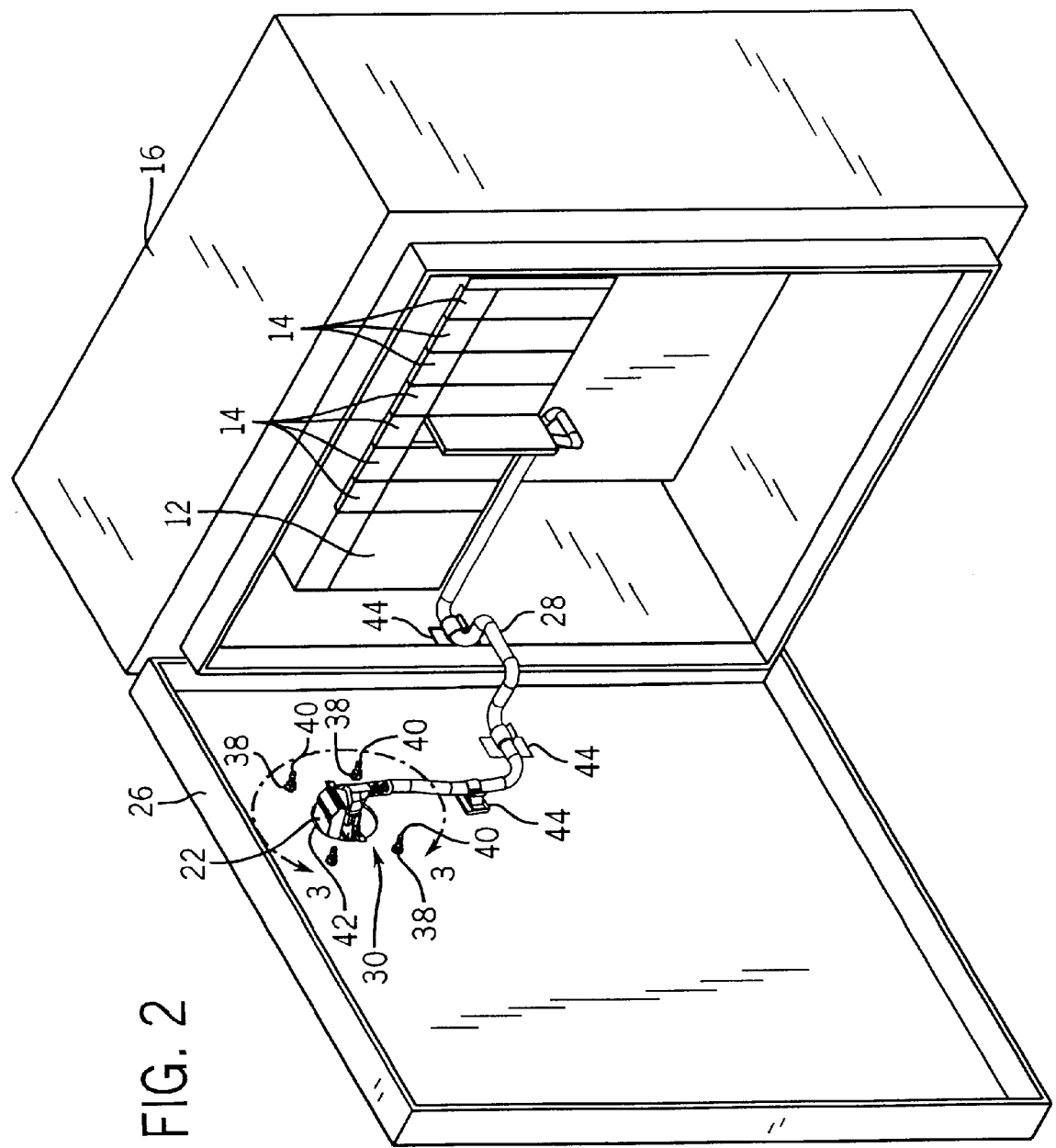
FIG. 2 is an interior view of an enclosure housing a PLC and having a through-panel connector, according to a present embodiment of the present invention.

Referring generally to FIG. 2, the interior of the enclosure 16 is illustrated. In this view, the front panel 26 of the enclosure 16 is shown in an open position. In this embodiment, the through-panel connector 22 is secured to the front panel 26 by four nuts 38 threaded onto four bolts 40. Alternatively, screws and threaded holes could be used to secure the through-panel connector 22 to the front panel 26. The front panel 26 has an opening 42 to allow the interior portion 30 of the through-panel connector 22 to extend into the interior of the enclosure 16. Internal cable 28 is shown routed from the I/O modules 14 to the interior portion 30 of the through-panel connector 22. Securing clamps 44 are used to secure internal cable 28 to enclosure 16. The enclosure may be any type of protective enclosure, such as metal or plastic. In a present embodiment, the enclosure 16 satisfies the requirements for a UL Type 4 enclosure.

Figure 3:
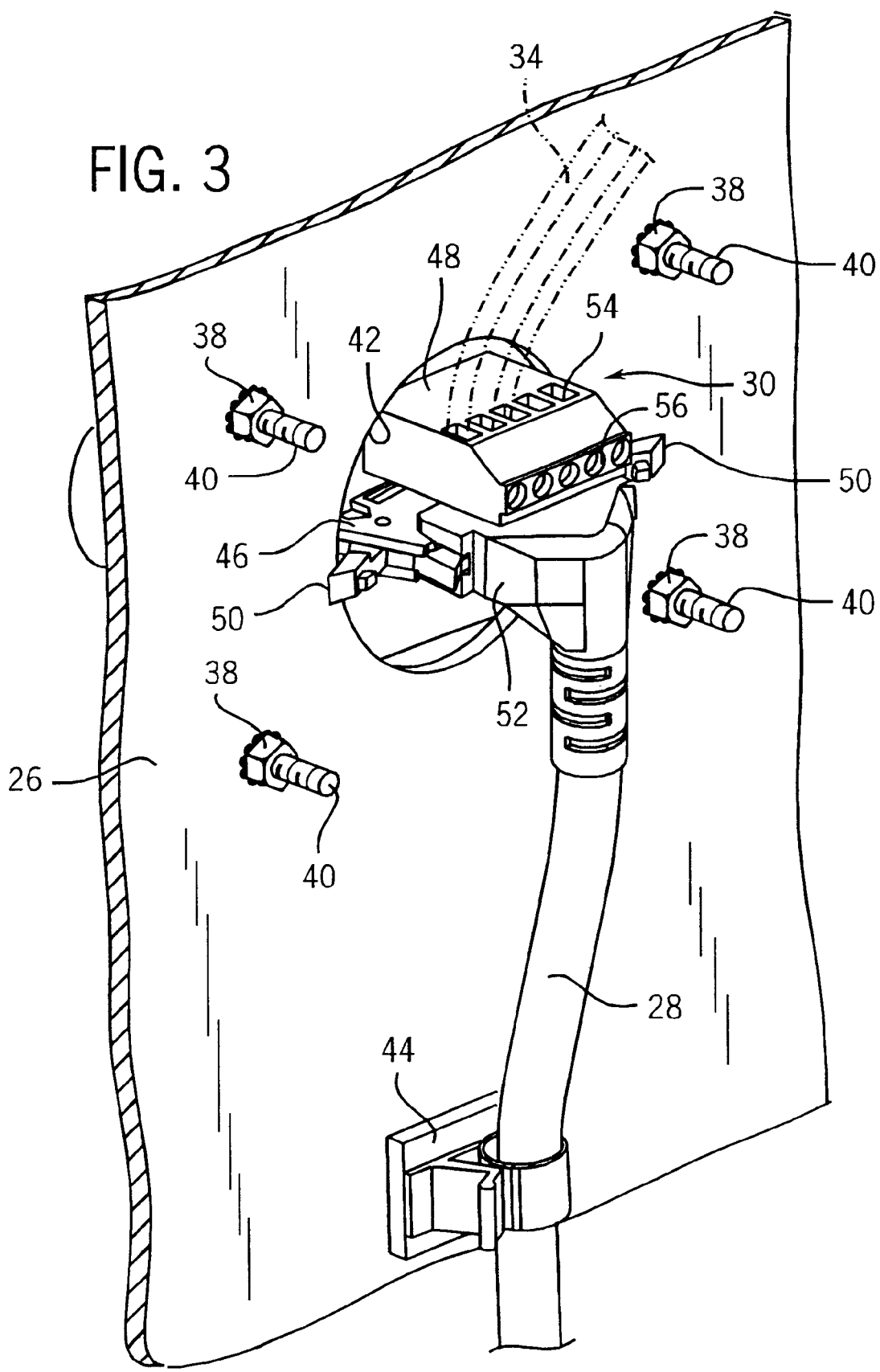
FIG. 3 is a detailed view taken generally along line 3—3 of FIG. 2.

As best illustrated in FIG. 3, the interior portion 30 of the through-panel connector 22 comprises a latch connector 46 and a terminal block 48. The latch connector 46 is coupled to the internal cable 28. The terminal block 48 is used to couple conductors 34 from an external source of power. However, other types of connectors, other than a latch connector or a terminal block, may be used. Additionally, the interior connector portion of the through-panel connector 22 may comprise a single electrical connector, such as the latch connector 46, coupled only to the PLC and not to a source of external power and/or data. In the exemplary embodiment, the latch connector 46 and the terminal block 48 are coupled through the through-panel connector 22 to an external electrical connector.

In this embodiment, the latch connector 46 is a 20-pin latch connector for coupling an internal cable 28 having up to twenty conductors. A connector that couples a greater or lesser number of conductors also can be used depending, for example, on the number of I/O modules involved. Each conductor in the cable has a termination configured to matingly engage a corresponding termination in the 20-pin latch connector. This enables multiple I/O modules 14, using two conductors each, to be coupled to through-panel connector 22. Additionally, the latch connector 46 has two latches 50 that are used to secure internal cable 28 to the latch connector 46. The latches 50 are operable to grasp onto each side of a cable connector 52 of internal cable 28.

In the illustrated embodiment, the terminal block 48 has five terminals 54 so that up to five conductors 34 can be coupled to the through-panel connector. For example, two electrical power conductors, two ground conductors, and a chassis ground conductor can be coupled to terminal block 48. However, different embodiments of the terminal block may have a different number of terminals to couple a greater or lesser number of conductors. In this embodiment, a conductor 34 is secured to a terminal 54 by rotating a tightening screw 56 to drive a conductive metal piece against the bare metal of the conductor. However, a variety of different types of electrical connectors can be used to couple an electrical conductor to the through-panel connector.

Figure 4:
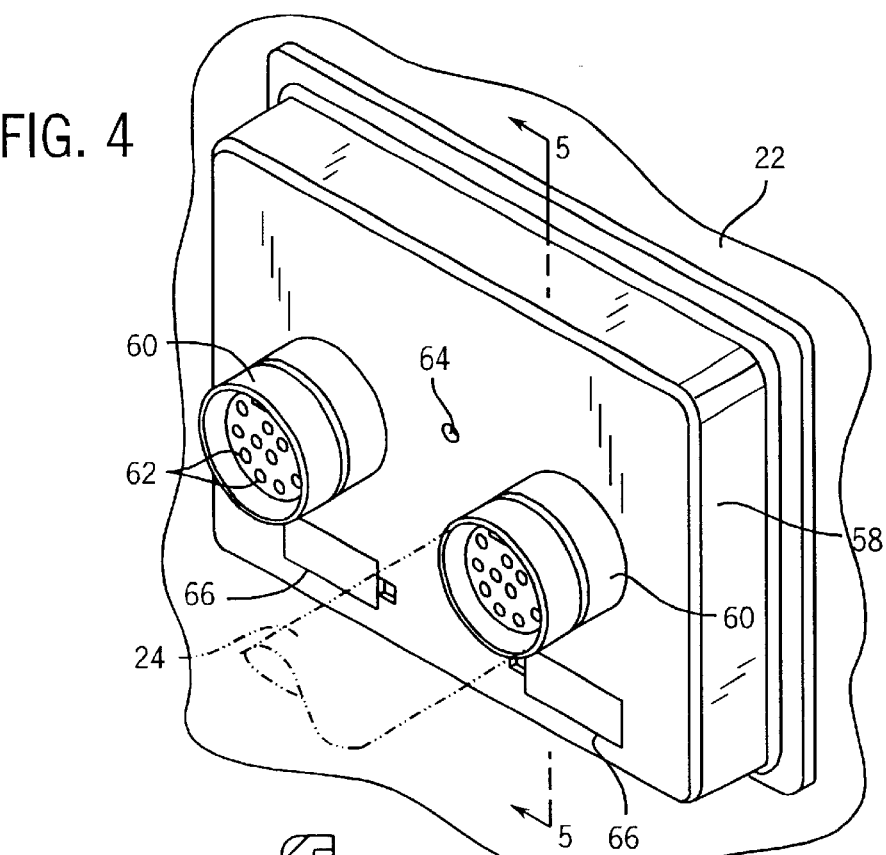
FIG. 4 is an exterior view of the through-panel connector of FIG. 2.

Referring generally to FIG. 4, the through-panel connector 22 has a housing 58 to house the various components of the through-panel connector 22. The housing 58 may be comprised of a metal, plastic material or a composite, or an assembly of such materials. The four bolts 40 used to secure the through-panel connector 22 to the enclosure 16 are secured to the housing 58. In the illustrated embodiment, the exterior connector portion 32 of the through-panel connector 22 comprises two external connectors 60. In the illustrated embodiment, each external connector 60 is a mini-change connector 60. The illustrated "mini-change" connectors 60 have twelve terminations 62 configured to matingly engage twelve terminations (not shown) in the electric cable 24. However, other types of connectors using a greater or lesser number of terminations can be used. In the illustrated embodiment, a power light 64 is provided to indicate that power is being supplied to the through-panel connector 22. Additionally, each external connector 60 has an associated nameplate 66 to identify the connector 60. The housing 58 may have other nameplates to identify the product or module.

In the illustrated embodiment, the two external connectors 60 are electrically coupled to both the latch connector 46 and the terminal block 48. Typically, the through-panel connector 22 is configured so that a number of I/O modules 14 are coupled to one external connector 60 and the remaining I/O modules 14 are coupled to the other external connector 60. However, the through-panel connector 22 may be configured in a variety of configurations. For example, all of the I/O modules 14 can be coupled by through-panel connector 22 to a single exterior connector. Additionally, through-panel connector 22 can be configured such that external power from the terminal block 48 is coupled to one or more external connectors 60. Alternatively, the external connectors 60 can be coupled to the latch connector 46 alone, the terminal block 48 also being coupled to the latch connector 46. Additionally, a greater or lesser number of external connectors can be used.

To couple the I/O modules 14 to a distribution block 18, one external cable 24 is connected to a mini-change connector 60 and routed to the distribution block 18. Another external cable 24 can be routed to a second distribution block 18, if used. Alternatively, two external cables 24 can be routed to a single distribution block 18. Additionally, a single external cable can be configured to connect to both of the mini-change connectors 60 and routed to a single distribution block 18.

Figure 5:
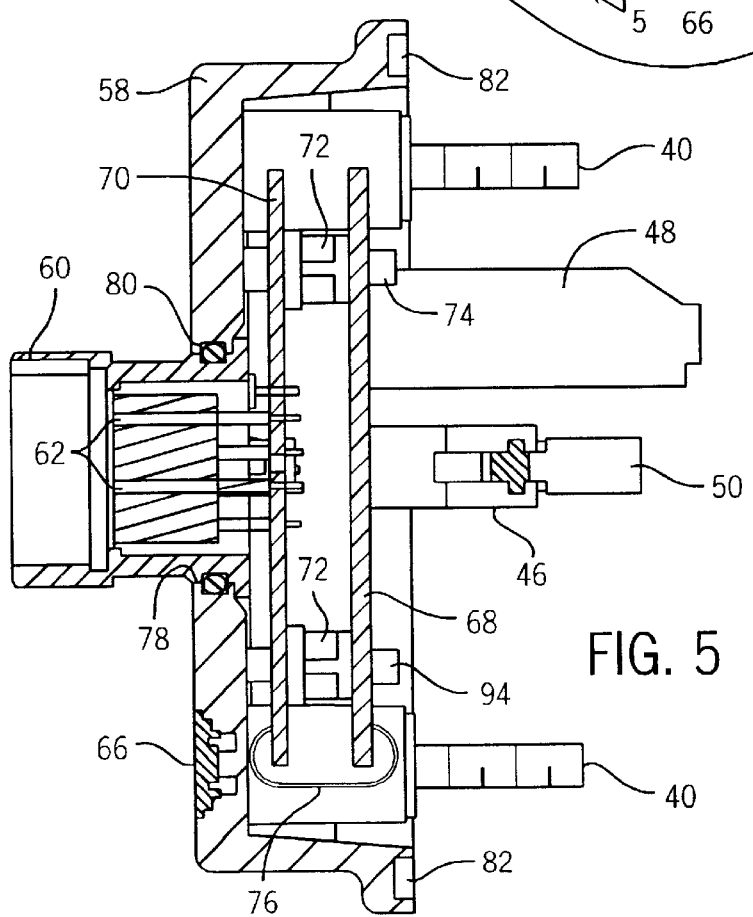
FIG. 5 is a cross-sectional view of the through-panel connector taken generally along line 6—6 of FIG. 4.

Referring generally to FIG. 5, the latch connector 46 and the terminal block 48 are mounted and electrically coupled to a first circuit board 68. The two mini-change connectors 60 are mounted and electrically coupled to a second circuit board 70. Four stand-offs 72 and four clips 74 are used to secure the first and second circuit boards to the housing 58. The clips 74 hold the first circuit board 68 against the stand-offs 72. The stand-offs 72 maintain the first and second circuit boards separated. Each stand-off 72 and clip 74 may be different parts of a single device. Furthermore, a greater or lesser number of stand-offs 72 and clips 74 may be used, as appropriate. Additionally, the first circuit board 68 is electrically coupled to the second circuit board 70 by a flexible jumper 76.

In the illustrated embodiment, the through-panel connector is configured so that the enclosure and through-panel connector form a sealed environment. Each mini-change connector 60 is inserted through an opening 78 in housing 58. Additionally, in this embodiment a seal 80 is used with each mini-change connector 60 to seal opening 78.

Additionally, the housing 58 has a recessed seat 82 extending around the perimeter of the housing to receive a sealing material, such as a gasket, such that a seal is formed between the enclosure 16 and the housing 58 when the housing 58 is secured to the enclosure 16.

Figure 6:
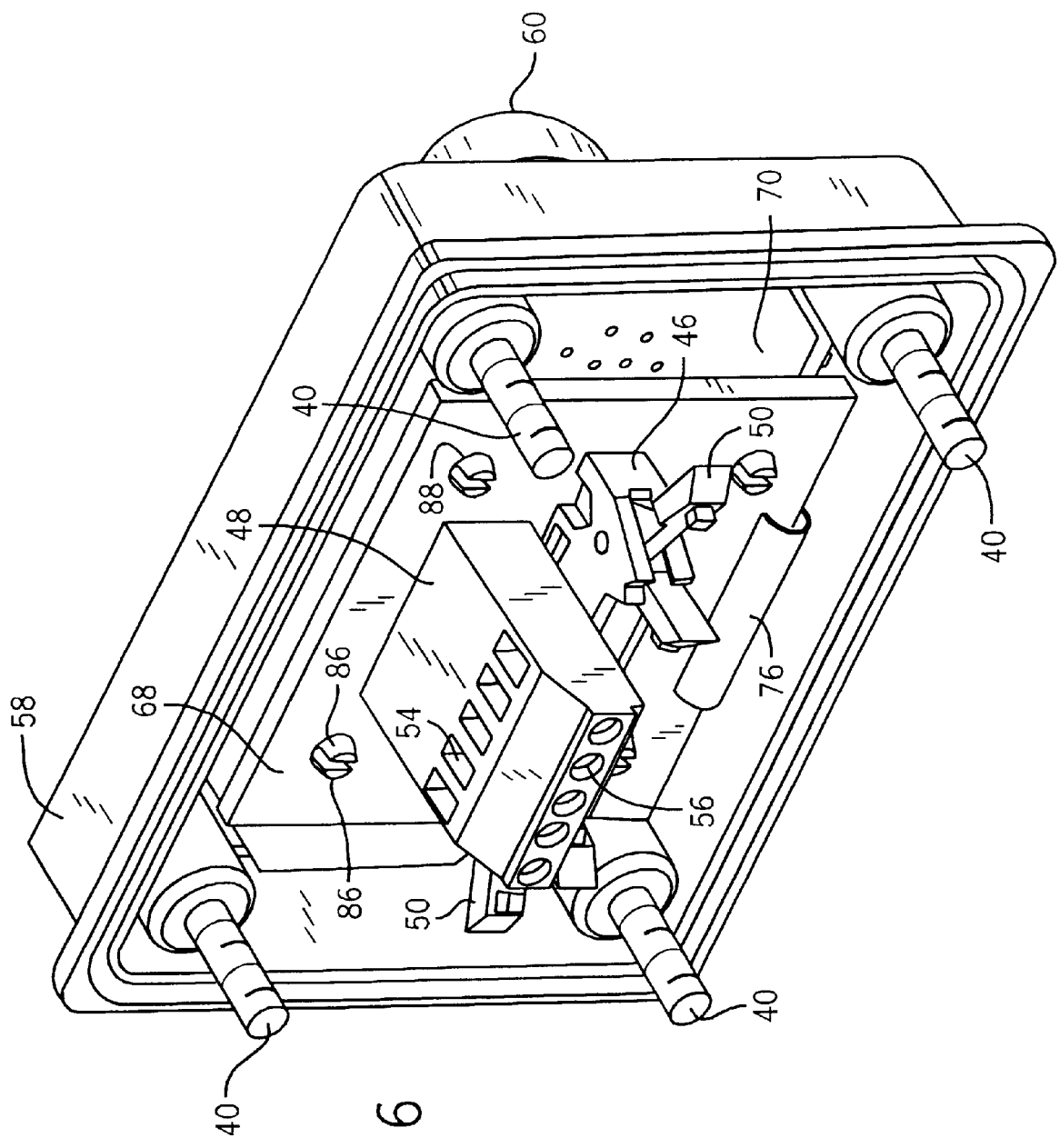
FIG. 6 is an interior view of the through-panel connector of FIG. 2.
Figure 7:
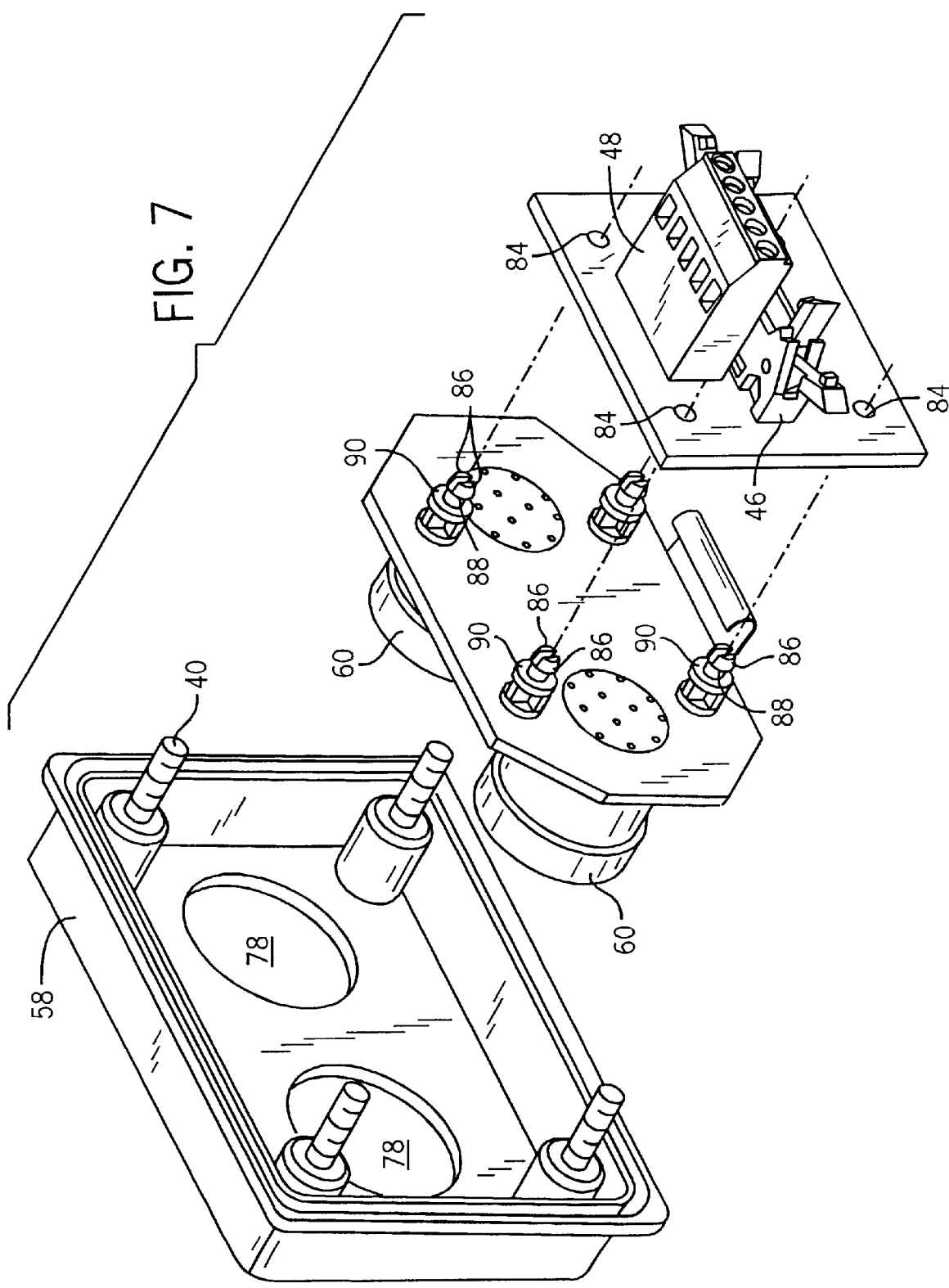
FIG. 7 is an exploded view of the through-panel connector of FIG. 2.

Referring generally to FIGS. 6 and 7, in the illustrated embodiment, the first circuit board is secured to the second circuit board by four clips 74. The clips 74 are secured to the second circuit board 70 and inserted through holes 84 in the first circuit board 68. In this embodiment, each clip comprises two flexible arms 86 with a catch portion 88 at the end of each arm 86 to hold the first circuit board against a flat portion 90 of each stand-off 72. The catch portions 88 and the two flexible arms 86 are flexed inward as a clip 74 is inserted through a hole 84. The flexible arms 86 expand outward once the catch portions 88 have cleared the hole 84, securing the first circuit board 68 to the second circuit board 70.

The embodiments described above enable an industrial control system to be electrically wired together with prefabricated lengths of cable. This provides many benefits to the operator of an industrial control system. For example, a prefabricated length of cable may be used to wire the system during the initial installation, rather than by having the system hard-wired. Attaching a cable to a connector, typically, takes much less time than hand-wiring individual conductors to an electrical connector. Electrical wiring is sometimes damaged during the course of operation. The present technique enables a damaged controller cable to be replaced much more easily than with a hard-wired system. In a hard-wired system, each conductor must be disconnected by hand at each end of the wiring to remove the damaged wiring, and then reconnected by hand to replacement wiring. With the present technique, the connectors at the ends of the damaged cable are disconnected at each end and the cable replaced with a replacement cable. Furthermore, the replacement may be preformed without having to open the enclosure housing the controller. Thus, maintaining the integrity of the enclosure. Furthermore, the present technique enables industrial control systems components to be moved more easily. For example, if a component, such as a controller, needs to be moved to a new location, the existing cable need simply be disconnected from the system and replaced with a new cable of the desired length.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of electrically coupling a programmable logic controller (PLC) housed within an enclosure to an electrical apparatus, comprising the acts of:
   routing an external electrical cable having a first electrical connector between the electrical apparatus and the enclosure;
   connecting the first electrical connector to a through-panel connector comprising an internal electrical connector electrically coupled to an external electrical connector; and
   connecting a removable internal electrical cable from the PLC to the internal electrical connector.

2. The method as recited in claim 1, further comprising the act of:
   coupling the external electrical cable to the electrical apparatus.

3. The method as recited in claim 2, further comprising the act of:
   connecting a second electrical connector on the external electrical cable to an apparatus electrical connector.

4. The method as recited in claim 1, wherein the through-panel connector further comprises a second internal electrical connector, the method further comprising the act of:
   coupling an external source of power to the second internal electrical connector.

5. The method as recited in claim 4, wherein the second internal electrical connector is a terminal block, further wherein coupling comprises securing a conductor from the external source of power to a terminal of the terminal block.

6. The method as recited in claim 1, further comprising the act of:
   coupling the through-panel connector to a chassis ground.

7. The method as recited in claim 1, further comprising the acts of:
   routing a second external electrical cable having a third electrical connector between the electrical apparatus and the enclosure;
   connecting the third electrical connector to a through-panel connector on the enclosure; and
   coupling the second external electrical cable to the electrical apparatus.

8. The method as recited in claim 7, wherein coupling the second external electrical cable comprises connecting a fourth electrical connector on the second external electrical cable to a second apparatus electrical connector.

9. A programmable logic controller (PLC) assembly, comprising:
   a protective enclosure;
   a PLC disposed within the protective enclosure;
   a rough-panel connector secured to the protective enclosure, wherein the through-panel connector is configured to electrically couple the PLC to an external electrical cable through the protective enclosure, wherein the through-panel connector comprises:
   an external connector configured for mating engagement with the external electrical cable; and
   an internal connector, the internal connector being electrically coupled to the external connector, wherein the internal connector is adapted for removable engagement with an internal electrical cable coupled to the PLC.

10. The assembly as recited in claim 9, further comprising the internal electrical cable, the internal electrical cable electrically coupling the PLC to the internal connector.

11. The assembly as recited in claim 9, wherein the PLC comprises a processor module electrically coupled to an input/output (I/O) module, the internal electrical cable electrically coupling the I/O module to the internal connector.

12. The assembly as recited in claim 9, wherein the through-panel connector comprises a housing to house the internal connector and the exterior connector.

13. The assembly as recited in claim 12, wherein the protective enclosure comprises a panel having an opening therethrough, the through-panel connector forming a seal over the opening when the through-panel connector is secured to the protective enclosure.

14. A trough-panel connector for a programmable logic controller (PLC), comprising:

a first electrical connector for coupling a removable internal cable from an input/output (I/O) module of the PLC to the through-panel connector; and a second electrical connector for coupling an external cable to the through-panel connector, wherein the first electrical connector and second electrical connector are electrically coupled.

15. The through-panel connector as recited in claim 14, further comprising a first circuit board and a second circuit board, wherein the first electrical connector is disposed on the first circuit board and the second electrical connector is disposed on the second circuit board.

16. The through-panel connector as recited in claim 15, wherein the first circuit board and second circuit board are electrically coupled by a jumper cable.

17. The through-panel connector as recited in claim 15, further comprising a third electrical connector, wherein the third electrical connector is disposed on the second circuit board and electrically coupled to the first electrical connector.

18. The through-panel connector as recited in claim 15, further comprising a terminal block, wherein the terminal block is disposed on the first circuit board.

19. The through-panel connector as recited in claim 18, wherein the terminal block is electrically coupled to the PLC.

20. The through-panel connector as recited in claim 18, wherein the terminal block is electrically coupled to the second electrical connector.

21. The through-panel connector as recited in claim 14, wherein the second electrical connector is a mini-change connector.

22. The through-panel connector as recited in claim 14, wherein the first electrical connector is a latch connector.

23. A method of assembling a programmable logic controller (PLC) within a protective enclosure, comprising the acts of:

coupling a first end of a removable electrical cable to the PLC; and coupling a second end of the removable electrical cable, opposite the first end, to an interior portion of a through-panel electrical connector.

24. The method as recited in claim 23, further comprising the act of:

securing the PLC within the protective enclosure.

25. The method as recited in claim 23, wherein coupling a second end of the electrical cable comprises connecting an electrical connector on the second end of the electrical cable to a first interior electrical connector of the through-panel connector.

26. The method as recited in claim 23, further comprising the act of:

connecting a conductor from a source of electrical power to a second interior electrical connector of the through-panel electrical connector.

27. An industrial control system, comprising:

an enclosure;

an electrical industrial control device secured within the enclosure; and a through-panel connector secured to the enclosure, the through-panel connector having a first electrical connector disposed on the interior of the enclosure and a second electrical connector disposed on the exterior of the enclosure, the second electrical connector being electrically coupled to the first electrical connector, wherein the first electrical connector is adapted for removable connection with a first electrical cable coupled to the electrical industrial control device and the second electrical connector is adapted for removable connection with a second electrical cable coupled to an external electrical industrial control device.

28. The system as recited in claim 27, wherein the first and second electrical connectors are threaded connectors.

29. A through-panel connector for an industrial control system enclosure, comprising:

an internal electrical connector adapted to matingly engage a first electrical connector of an internal electrical cable, the internal electrical cable being removably coupleable to an industrial control module housed within the enclosure; and an external electrical connector adapted to matingly engage a second electrical connector of an external electrical cable, the external electrical cable being removably coupleable to an external industrial control module disposed externally to the enclosure, wherein the internal electrical connector is electrically coupled to the external electrical connector.

30. The through-panel connector as recited in claim 29, further comprising a first circuit board and a second circuit board, wherein the internal electrical connector is disposed on the first circuit board and the external electrical connector is disposed on the second circuit board.

31. A method of electrically coupling at least one industrial control module housed within an enclosure to an external electrical apparatus, comprising the acts of:

routing an internal electrical cable having a first electrical connector between the at least one industrial control module and an internal electrical connector of a through-panel connector assembly secured to the enclosure; and routing an external electrical connector having a second electrical connector between the external electrical apparatus and an external electrical connector of the through panel connector assembly, the external electrical connector being electrically coupled to the internal electrical connector by the through-panel connector assembly.

* * * * *